UNITED STATES PATENT OFFICE.

CORNELIUS MASSATSCH, OF BERLIN-TEMPELHOF, GERMANY, ASSIGNOR TO PERMUTIT-AKTIENGESELLSCHAFT, OF BERLIN, GERMANY.

PROCESS FOR CLARIFYING AND STERILIZING WATER.

1,107,199.  Specification of Letters Patent.  Patented Aug. 11, 1914.

No Drawing.  Application filed February 6, 1914.  Serial No. 817,010.

*To all whom it may concern:*

Be it known that I, Dr. CORNELIUS MASSATSCH, subject of the German Emperor, residing at Berlin-Tempelhof, Germany, have invented a certain new and useful Process for Clarifying and Sterilizing Water, of which the following is a specification.

The specification of Patent No. 1082315 describes a process for clarifying and sterilizing water, wherein a clear brown colloidal solution of intermediate oxids of manganese is primarily produced in the water to be treated, either by the addition of permanganates alone, in case the water contains a sufficient amount of oxidizable organic substances to reduce a part of the permanganate to manganous salts or by adding both permanganates and manganous salts, in case the water contains no organic matter or only very minute quantities, after which the water is filtered over reduced or oxidized oxids of manganese without zeolites or in conjunction with natural or artificial zeolites, according to the predominance of permanganate or of manganous oxid in the water.

I have discovered, that clarification and sterilization of water by this method of forming a colloidal solution of manganese oxids therein, may be substantially simplified, if such colloidal solution, which may be produced by the addition to the water of suitable small quantities of permanganate and a manganous salt, is immediately, that is to say before the production of any coagulum or formation of a precipitate or other action on the constituents of the water, filtered at high speed through a filter consisting of fine sand, whereby clear and bacteriologically unobjectionable filtrates are obtained. The sand has the power of producing a separation of gelatinous oxids from the colloidal solution, this separation carrying with it organisms and suspended matter. The dissolved manganese is removed. An important feature of the process is, that it reduces very largely also the contents of organic matter.

The object of the present invention being to produce a colloidal solution of manganese oxids in the water and not a precipitate or flocculation prior to filtration, the concentration of the permanganate with most waters should be quite small; and particularly if they contain flocculation-producing salts. With many waters an addition of about three parts per million (3 milligrams per liter) of permanganate and, say, about 9 parts of a manganese salt, such as manganese sulfate, works well.

Example: Ordinary water such as provided by domestic water supply companies, was artificially infected with various germs, until the water contained about 1½ to 3 millions per cubic centimeter. To each liter of this water was added a solution of 3 milligrams of potassium-permanganate and 9 mg. of sulfate of manganese. The result was a deep brown, clear and transparent liquid, which was immediately filtered at a speed of 10 meters over sand composed of particles one millimeter thick. The filtrate was clear and contained 20 germs per cubic centimeter, and the contents of organic matter was reduced to a quantity corresponding to 3 mg. of permanganate. The amount of organic matter originally present in this water corresponded to 8 mg. The effect of the sand filter is extraordinarily rapid. A prolonged preliminary use or preparation of the filter is not necessary. The sand itself seems to have a catalytic influence, by promoting the flaking out of the colloids contained in the solutions not only of the colloid manganese oxids produced in the process but of other colloids as well. An important advantage to be observed is that filtration takes place immediately after the addition of the solutions. The additions of permanganate and manganous salt required in each case and their quantity depend on the nature of the water and should be ascertained in each case by preliminary experiments. For the majority of waters the ratio between the salts of manganese and the permanganate should be chosen in such a manner, that there will be no excess of manganese passing through with the filtrate. If such excess should nevertheless occur, it may be removed by the use of a zeolite filter having the higher oxids of manganese distributed through it in a finely divided condition.

What I claim is:—

1. The process of clarifying and sterilizing water, which consists in adding to the water to be purified a permanganate and a manganous oxid salt in such quantities that clear brown colloidal solutions of oxids of manganese are obtained and then immediately filtering these solutions at high speed through filters consisting of fine sand, substantially as described.

2. The process of clarifying and sterilizing water which comprises producing a brown colloidal solution of intermediate manganese oxids in such water and filtering the treated water at a high speed through a sand filter prior to precipitation or substantial reduction occurring in such colloidal solution.

In testimony whereof I have hereunto set my hand in presence of two subscribing witnesses.

Dr. CORNELIUS MASSATSCH.

Witnesses:
WOLDEMAR HAUPT.
HENRY HASPER.

---

Copies of this patent may be obtained for five cents each, by addressing the "Commissioner of Patents, Washington, D. C."